(No Model.)
T. J. HUDDERS.
PISTON ROD PACKING.
No. 515,227. Patented Feb. 20, 1894.
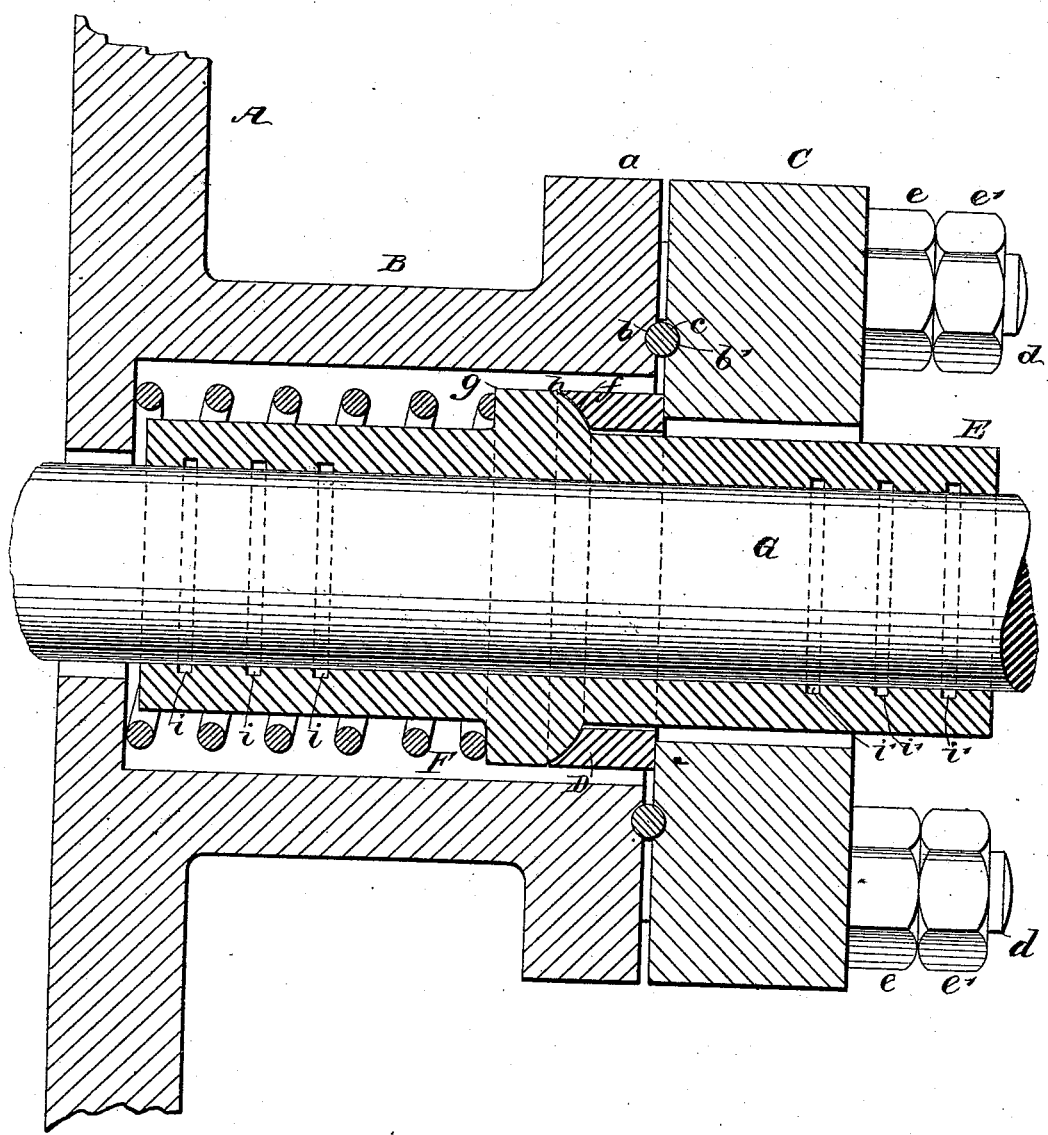
WITNESSES:
H. Walker
C. Sedgwick
INVENTOR
T. J. Hudders
BY Munn & Co
ATTORNEYS.

UNITED STATES PATENT OFFICE.

THOMAS J. HUDDERS, OF ST. PAUL, MINNESOTA.

PISTON-ROD PACKING.

SPECIFICATION forming part of Letters Patent No. 515,227, dated February 20, 1894.

Application filed June 20, 1893. Serial No. 478,217. (No model.)

*To all whom it may concern:*

Be it known that I, THOMAS J. HUDDERS, of St. Paul, in the county of Ramsey and State of Minnesota, have invented a new and Improved Piston-Rod Packing, of which the following is a specification, reference being had to the accompanying drawing, which is a longitudinal section.

The object of my invention is to construct a simple and effective piston rod packing adapted for use in an ordinary gland or stuffing box, and arranged so that it will adapt itself to any irregularity in the movement of the piston rod.

My invention consists in a concave annular seat fitted to the stuffing box cap, a sleeve provided with a collar at or near the center thereof, having a concave surface fitted to the annular seat and provided with internal circular grooves at opposite ends, and a spiral spring placed in the stuffing box and arranged to press the sleeve outwardly against the seat.

It also consists in the combination with the stuffing box and stuffing box cap furnished with annular grooves, of a packing ring of circular cross section fitted to the said grooves, all as will be hereinafter more fully described.

The cylinder head A, is provided with a stuffing box B, attached to or formed integrally therewith, having the flange $a$ in which is formed a circular groove $b$. To the stuffing box B is fitted the cap C, which is furnished with an annular groove $b'$ corresponding with the groove $b$ of the stuffing box, and between the stuffing box and the cap is placed a packing ring $c$, of circular cross section, formed of copper or other soft material which will adapt itself closely to the surfaces with which it comes in contact. The cap C is held in position by studs $d$ screwed into the flange $a$ of the stuffing box and provided with nuts $e$ and jam nuts $e'$.

To the inner face of the cap C is fitted an annular seat D, having a concave inner face $f$. In the stuffing box B is placed a sleeve E, which extends from the inner portion of the box to a point beyond the cap C, the said sleeve being provided with a collar $g$, having a convex face $h$ fitted to the concave face $f$ of the annular seat D. The rear face of the collar $g$ forms a square shoulder for receiving the spiral spring F, surrounding the inner end of the sleeve E, and resting on the cylinder head at the inner end of the stuffing box. In the inner face of the rear end of the sleeve E are formed grooves $i$, and in the inner face of the outer end of the sleeve E are formed grooves $i'$. The grooves $i$ $i'$ being narrow and shallow retain water and steam, steam being retained in the inner groove $i$ and water in the outer grooves $i'$, and the water and steam together form a frictionless packing for the piston rod. The sleeve E being seated on a practically spherical seat, can yield to accommodate itself to any inequalities or lack of alignment in the piston rod G which slides through the sleeve E. Any lateral movement in the piston rod is allowed by the movement of the annular seat D on the inner surface of the cap C.

By means of my improvement, friction and wear are reduced to a minimum, and the labor and delay of packing a piston rod is obviated.

Having thus described my invention, I claim as new and desire to secure by Letters Patent—

In a piston packing, the combination with a stuffing box provided with a flange, and a cap secured to the said flange, of an annular seat fitted to the inner face of the cap and having a concave inner face, a sleeve in the stuffing box, projecting through the cap and provided at about the middle of its length with an annular collar having a convex outer face, and a spring surrounding the inner end of the sleeve and having one end bearing against the said collar and the other against the cylinder head at the inner end of the stuffing box, substantially as herein shown and described.

THOMAS J. HUDDERS.

Witnesses:
CHRISTIAN MEYER,
B. R. McCRUDDEN.